| (12) United States Patent<br>Dev | (10) Patent No.: US 10,356,002 B2<br>(45) Date of Patent: Jul. 16, 2019 |
|---|---|

(54) PROCESSING REAL-TIME MULTIPOINT-TO-POINT TRAFFIC

(71) Applicant: Nokia Solutions and Networks Oy, Espoo (FI)

(72) Inventor: Abhilash Dev, Bartlett, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/413,851

(22) Filed: Jan. 24, 2017

(65) Prior Publication Data

US 2018/0212893 A1   Jul. 26, 2018

(51) Int. Cl.
  *H04L 12/875*  (2013.01)
  *H04B 7/0413*  (2017.01)
  *H04L 29/08*  (2006.01)
  *H04W 88/08*  (2009.01)

(52) U.S. Cl.
  CPC ......... *H04L 47/564* (2013.01); *H04B 7/0413* (2013.01); *H04L 67/1097* (2013.01); *H04W 88/085* (2013.01)

(58) Field of Classification Search
  CPC ... H04L 47/564; H04L 67/1097; H04L 47/15; H04L 47/826; H04L 47/28; H04L 47/56; H04L 47/00; H04L 2012/5651; H04L 47/2416; H04L 47/32; H04L 47/801; H04B 7/0413; H04W 88/085; H04W 28/14; H04W 56/004; H04W 56/00; H04W 72/1242; H04W 72/1247; H04W 72/0446
  See application file for complete search history.

(56) References Cited

U.S. PATENT DOCUMENTS

| 2009/0285217 | A1 | 11/2009 | Frink et al. | |
| 2010/0183021 | A1* | 7/2010 | Cloonan | H04L 47/10 370/412 |
| 2012/0044887 | A1* | 2/2012 | Zdarsky | H04L 67/02 370/329 |
| 2014/0286256 | A1* | 9/2014 | Chowdhury | H04L 47/56 370/329 |
| 2017/0265215 | A1* | 9/2017 | Chaudhuri | H04L 1/0018 |
| 2017/0295591 | A1* | 10/2017 | Nguyen | H04W 72/1247 |
| 2017/0317944 | A1* | 11/2017 | John | H04L 47/56 |

FOREIGN PATENT DOCUMENTS

| EP | 2443884 A1 | 4/2012 |
| WO | WO-2016113469 A1 | 7/2016 |

* cited by examiner

*Primary Examiner* — Charles C Jiang
*Assistant Examiner* — Rosene Clark
(74) *Attorney, Agent, or Firm* — Harrington & Smith

(57) ABSTRACT

Each of N sets of memory space bins are associated with a different processing deadline (N is an integer greater than two or one). Messages are received from multiple distinct sources (for example, received at a base station or network interface card from multi-points of a communication system) are stored in one of the memory space bins of the set whose processing deadline corresponds to a transmit deadline of the respective message. In response to a triggering condition for a respective set being satisfied, all the messages stored in any of the bins of the respective set are processed for transmission and the messages that were processed are cleared from their respective bins. In specific embodiments, the triggering condition is expiry of a timer offset ahead of the set's processing deadline, and each set's bin has a different priority and the processing is done in priority order.

18 Claims, 12 Drawing Sheets

PROCESSING REAL-TIME MULTIPOINT-TO-POINT TRAFFIC

TECHNOLOGICAL FIELD

The described invention relates to management and processing of messages that are communicated in wireless systems, and more particularly to storing such messages in computer memory and processing of same when such messages arrive from multiple parallel data streams from multiple distributed sources and have different latency requirements for either being consumed or being sent to the next respective destination.

BACKGROUND

Wireless radio access technologies continue to be improved to handle increased data volumes and larger numbers of subscribers. The 3GPP organization is developing a new radio system (commonly referred to at this time as $5^{th}$ Generation/5G) to handle peak data rates of the order of ~10 Gbps (gigabits per second) while still satisfying ultra-low latency requirements in existence for certain 4G applications. 5G intends to utilize radio spectrum on the order of GHz or more in the millimeter-wave (mmWave) band; and also to support massive MIMO (m-MIMO). M-MIMO systems are characterized by a much larger number of antennas as compared to 4G systems, as well as finer beamforming and a higher antenna gain.

FIG. 1 is a schematic overview of an example 5G radio environment in which these teachings may be deployed. Rather than a conventional unitary cellular base station such as a typical eNB of an E-UTRAN system, the 5G system is to have the conventional base station's functionality distributed among a baseband unit (BBU, which may be implemented as a single BBU or multiple interconnected BBUs) and one or typically multiple remote radio heads (RRHs) each located up to a few kilometers from the BBU. For more generality beyond only 5G, FIG. 1 shows a Master 20 that would be the BBU in a 5G system and multiple antennas (ANTs) 30 that would be the RRHs in a 5G network. Each ANT/RRH 30 is operationally connected to its Master/BBU 20 via a wired or wireless bidirectional transmission link which may be known in 5G as a front haul (FH) link. The BBU/RRH combination in 5G systems may be referred to as a gNB. On the uplink these multiple ANTs/RRHs 30 are the multi-points sending messages to the Master/BBU 20 that is in the position of point in multipoint-to-point communications. A given UE (not shown at FIG. 1) may have active connections with one or more of the ANTs/RRHs 30, which in the 5G system would be operating as a transmission/reception point (TRP) of the gNB. There is a somewhat similar distribution of access node functionality in cloud-based radio access networks (C-RAN) that are currently being deployed in at least some LTE networks, though those systems typically use a different terminology than BBU and RRH. 5G and C-RAN are but two non-limiting radio environments that utilize multipoint-to-point communications in which these teachings may be practiced to advantage.

From the perspective of the point (Master 20 in FIG. 1), these continuous streams of data traffic from distributed sources must be gathered and processed. Among these streams different messages have different latency requirements and be of different message types. In any kind of distributed system that involves processing streams of real-time traffic from multiple sources based on strict deadlines, the challenge is to combine the data received from such parallel streams and process it based on the intended deadlines. For example, in the LTE system messages are exchanged on a per-transmit-time-interval (TTI) basis and so their transmit deadlines will be at the TTI boundary meaning processing must begin sometime in advance of that boundary to meet the transmit deadline. Such challenges are commonplace in systems such as in Single Frequency Networks (SFN) where access points are distributed and are constantly streaming the data traffic to some centrally-located unit for further combining and processing. With highly distributed systems like 5G and C-RAN the problem of dealing with multiple parallel data streams which require correlating data received from separate data streams within the strict processing deadlines becomes even more complex.

With regards to the SFN, the layer 2 processing of the wireless networking protocol stack resides on the centrally located Master 20 whereas either both of the layer 1 processing and the antennas or just the antennas are spread out as the ANTs so as to each form a node in a multipoint distribution to provide the wireless coverage over a larger area. Generally layer 1 represents RF level signal processing and layer 2 represents baseband level processing, but in different systems and even among current discussions for 5G (due to beamforming considerations) there is a wide range of how much processing is to be done by the ANTs 30 prior to forwarding the signal to the Master 20. Regardless, the data from each of the distributed ANTs 30 is received by Master 20 continuously and processed there based on the timing information that is present in each received message. The data stream received from each ANT 30 typically cannot be processed independently of the data stream received from other ANTs, for example because the data pertinent to a single user could be received from multiple ANTs in which case it must be correlated from the different streams. Similarly, signal strength measurements received from each data stream from each ANT has to be compared.

The data packets received at the Master 20 from the ANTs 30 have a timestamp carrying timing information that helps the Master 20 to organize the different data packets based on time and also to handle timeouts and retransmissions. This timing information in different messages from different streams and different sources is correlated when messages from different streams need to be correlated, and this timing information is also compared against the Master's system clock to ensure the latency deadline of each message is met.

Data packet correlation among different continuous streams using timing as well as packet content is quite challenging in SFN-like systems because it must be done within strict time limits to avoid packet delay or discard further downstream. Previous solutions to this problem dealt with a much smaller number of data streams and much less volume of traffic than is anticipated for 5G and C-RAN deployments, and those previous solutions are not seen to be reasonably adaptable to meet this new challenge. This is because most of the distributed multipoint-to-point messaging techniques involve processing each stream received at the master independently and increases to the number of streams could be handled by simple scaling of networking and computing resources. In SFN-like systems such as 5G and C-RAN the assumption that the data streams can be handled independently does not hold. As the volume of traffic being received at the master scales with the number of distributed access points, the complexity of handling all those data streams also increases and merely adding parallel processing capacity addresses the volume increase but not the complexity increase that arises from correlating messages received on different streams.

The solution presented herein addresses this problem of processing and combining messages at the receiver's (master's) end in systems that involve Multipoint-to-Point realtime traffic, where the messages are of different types, come from different distributed sources, carry different deadlines/latency requirements, and may need to be correlated across streams.

BRIEF DESCRIPTION OF THE DRAWINGS

According to a first embodiment of these teachings there is a method comprising: associating a different processing deadline with each of N sets of memory space bins, where N is an integer greater than two; as messages are received from multiple distinct sources, storing each respective message in one of the memory space bins of the set for which the processing deadline corresponds to a transmit deadline of the respective message; and in response to a triggering condition for a respective set being satisfied, processing all the messages stored in any of the bins of the respective set and clearing the messages that were processed from their respective bins. In some implementations N can be an integer greater than one.

According to a second embodiment of these teachings there is an apparatus comprising at least one processor and at least one computer readable memory tangibly storing computer program instructions. In this embodiment the at least one processor is configured with the at least one computer readable memory tangibly and the computer program instructions to cause the apparatus to perform actions comprising: associate a different processing deadline with each of N sets of memory space bins, where N is an integer greater than two (or one); as messages are received from multiple distinct sources, store each respective message in one of the memory space bins of the set for which the processing deadline corresponds to a transmit deadline of the respective message; and in response to a triggering condition for a respective set being satisfied, process all the messages stored in any of the bins of the respective set and clearing the messages that were processed from their respective bins.

According to a third embodiment of these teachings there is computer readable memory tangibly storing a program of computer executable instructions. In this embodiment execution of the instructions by one or more processors causes a host device (such as a network interface card or a base station) to at least: associate a different processing deadline with each of N sets of memory space bins, where N is an integer greater than two (or one); as messages are received from multiple distinct sources, store each respective message in one of the memory space bins of the set for which the processing deadline corresponds to a transmit deadline of the respective message; and in response to a triggering condition for a respective set being satisfied, process all the messages stored in any of the bins of the respective set and clearing the messages that were processed from their respective bins.

According to a fourth embodiment of these teachings there is an apparatus comprising computing means and memory means. In this embodiment the computing means is for associating a different processing deadline with each of N sets of memory space bins of the memory means, where N is an integer greater than two (or one). As messages are received from multiple distinct sources, the computing means is further for storing each respective message in one of the memory space bins of the set for which the processing deadline corresponds to a transmit deadline of the respective message. The computing means is further for, in response to a triggering condition for a respective set being satisfied, processing all the messages stored in any of the bins of the respective set and clearing the messages that were processed from their respective bins. In a particular embodiment the computing means comprises one or more digital processors and the memory means comprises a computer readable memory.

BRIEF DESCRIPTION OF THE DRAWINGS

Figure 1:
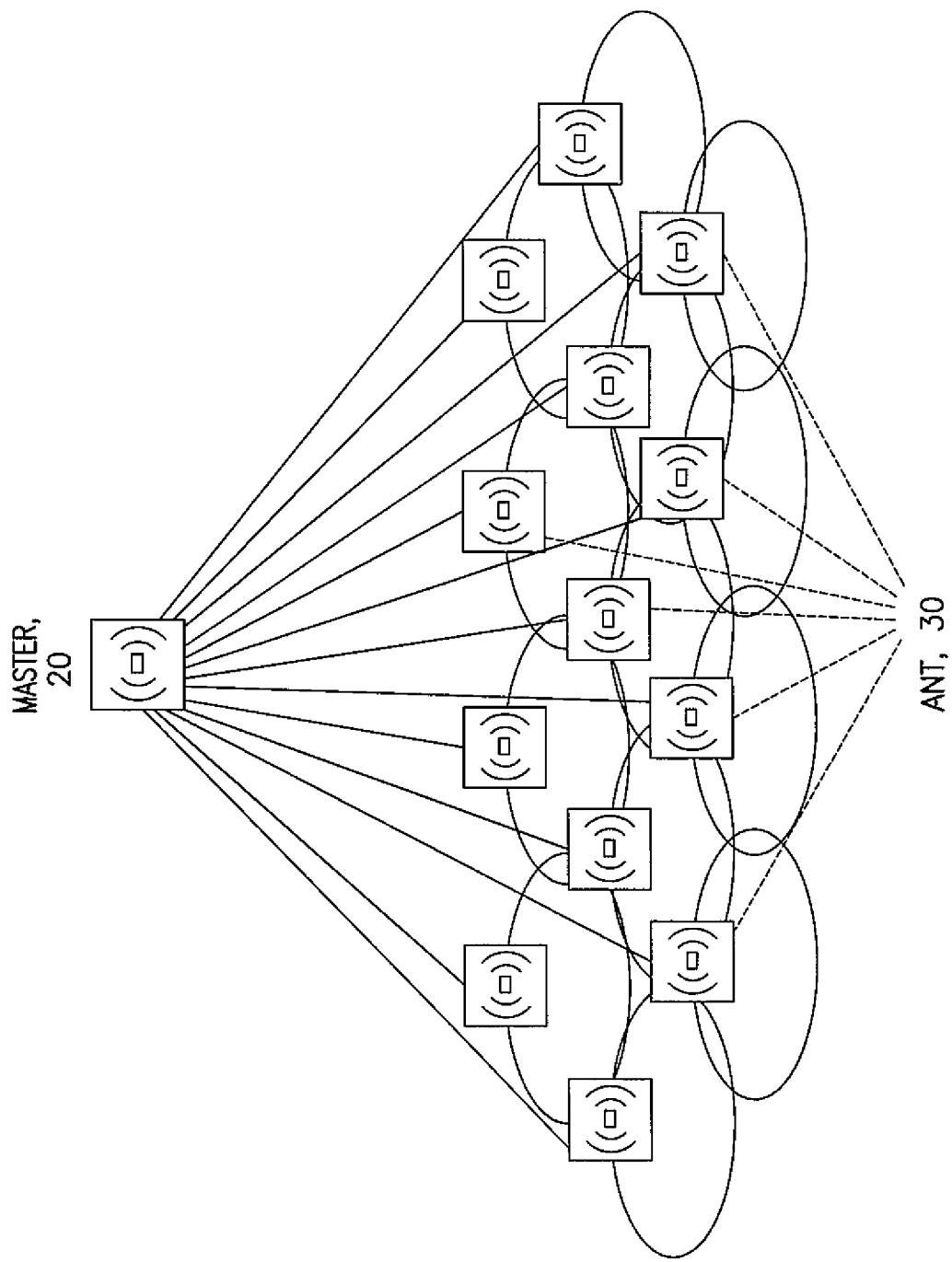

FIG. 1 is a plan view illustration of a multipoint-to-point radio environment in which embodiments of these teachings may be practiced to advantage.

Figure 2:
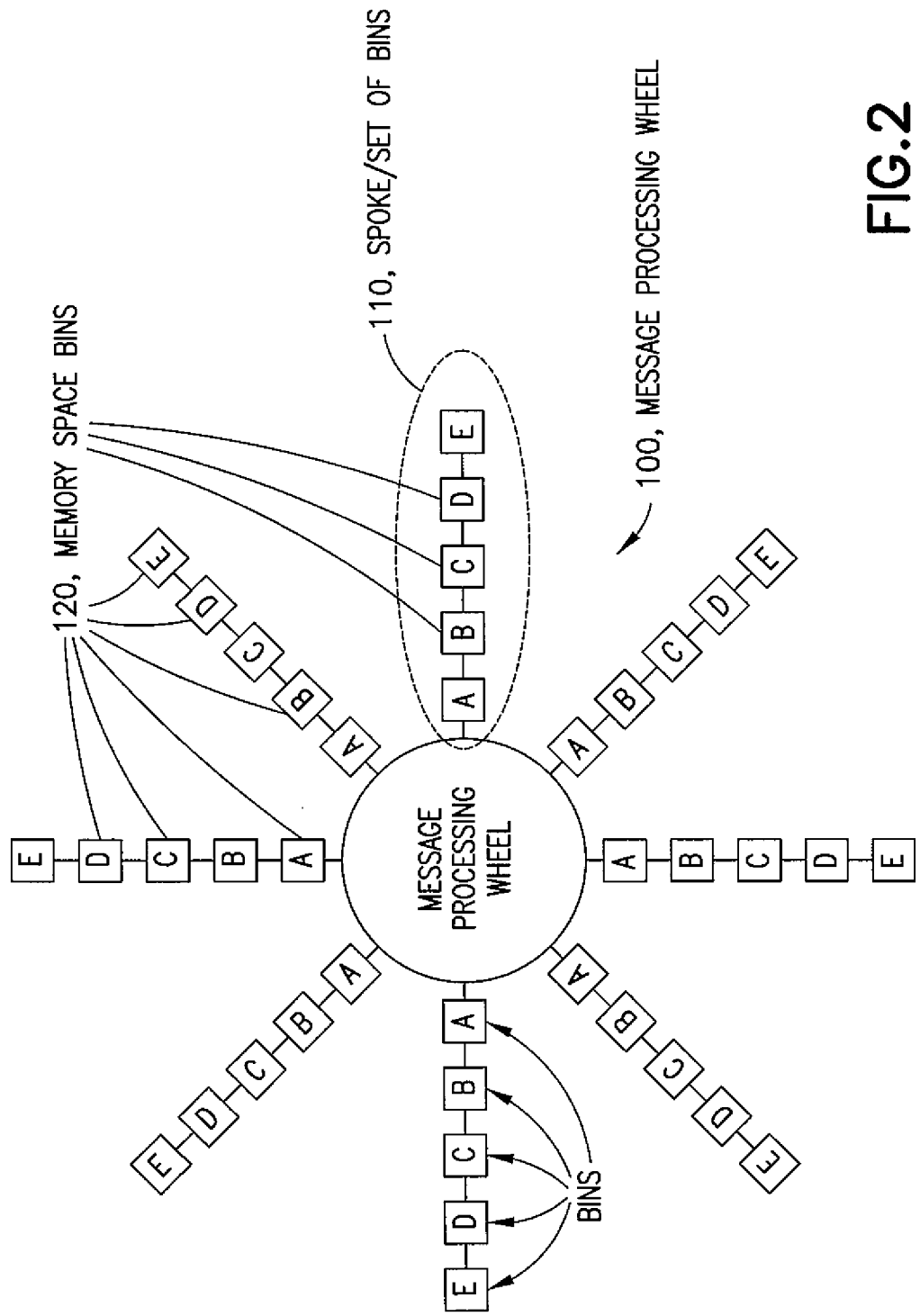

FIG. 2 illustrates an example of the data organization aspects of these teachings in the conceptual terms of a message processing wheel with spokes in which memory space bins are allocated.

Figure 3:
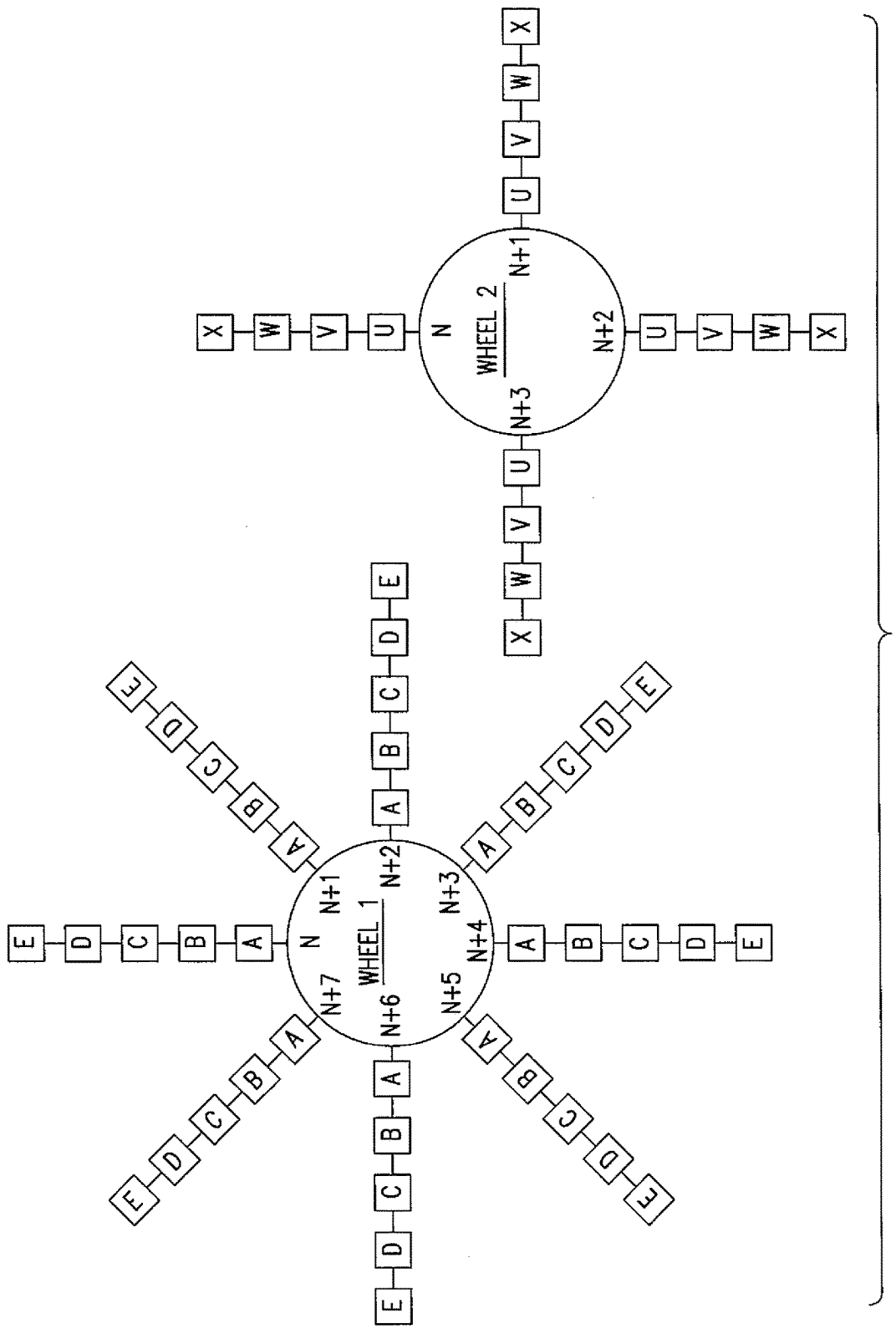

FIG. 3 is similar to FIG. 2 but showing multiple message processing wheels for handling messages in case messages are too voluminous for the processing times one wheel would allow.

Figure 4:
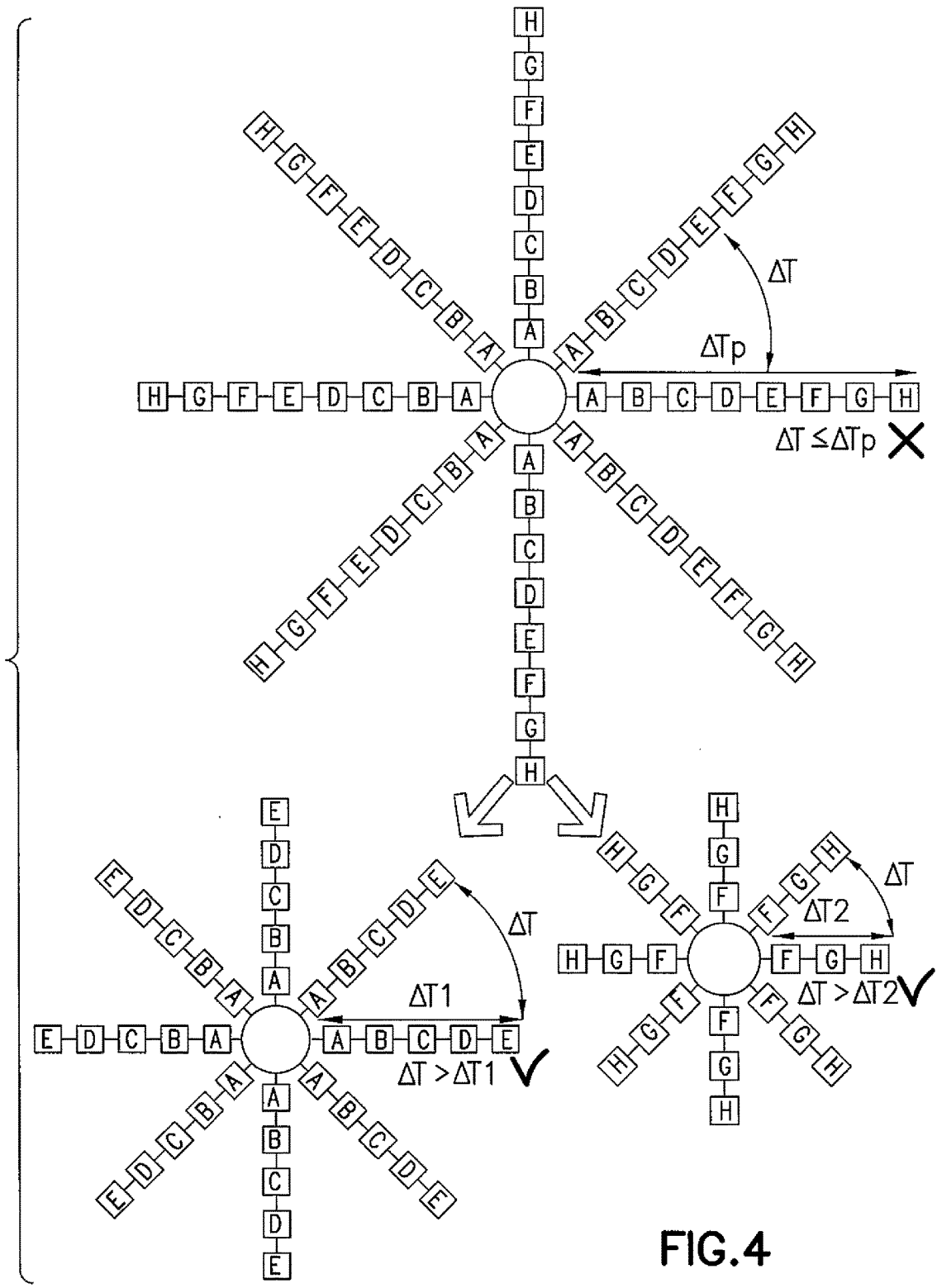

FIG. 4 is similar to FIG. 2 and further showing that time needed for processing messages on a spoke is reduced by distributing the messages across more than one wheel.

Figure 5:
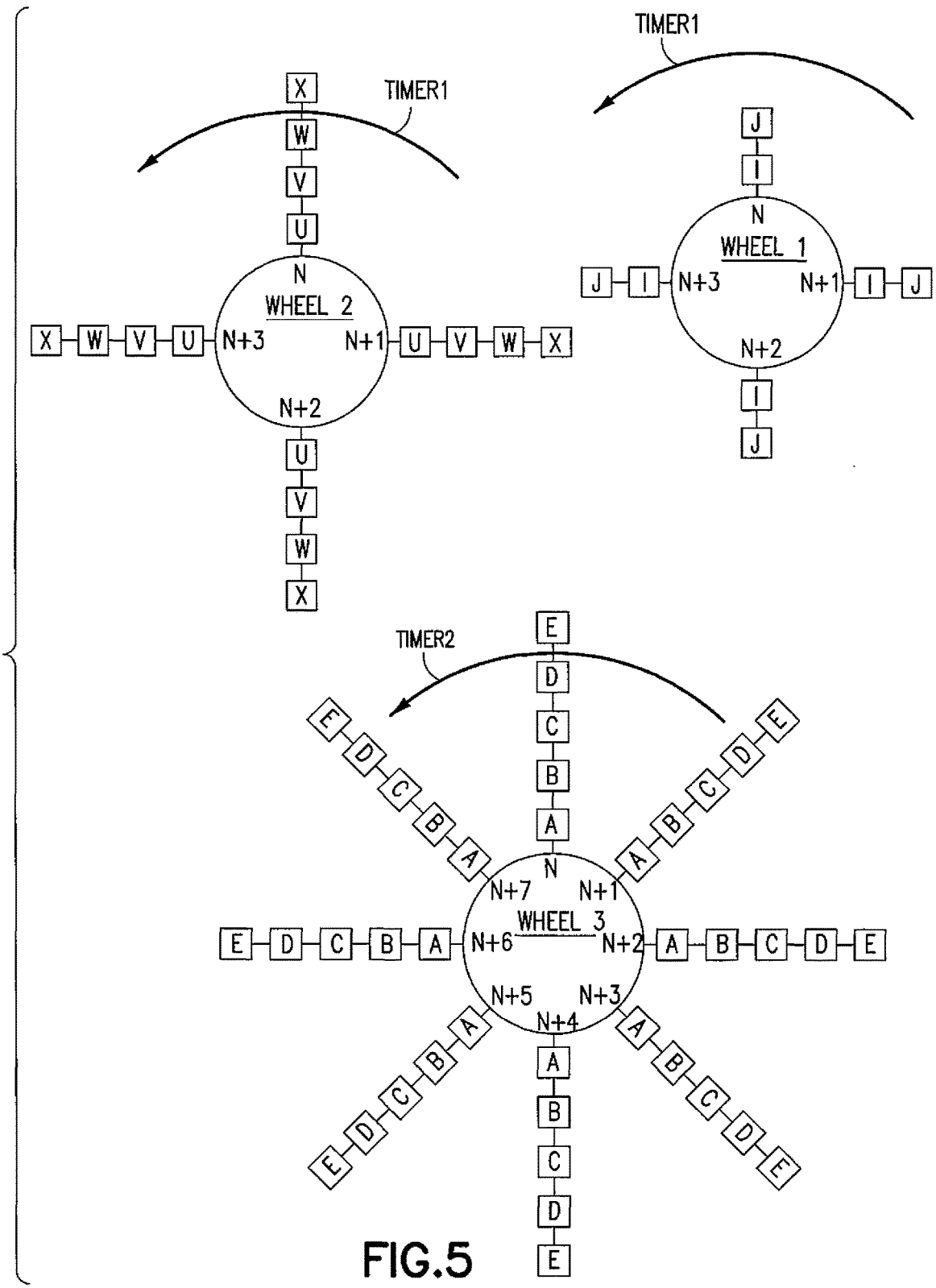

FIG. 5 is similar to FIG. 2 and showing that multiple message processing wheels can be driven by the same or by different timing sources.

Figure 6:
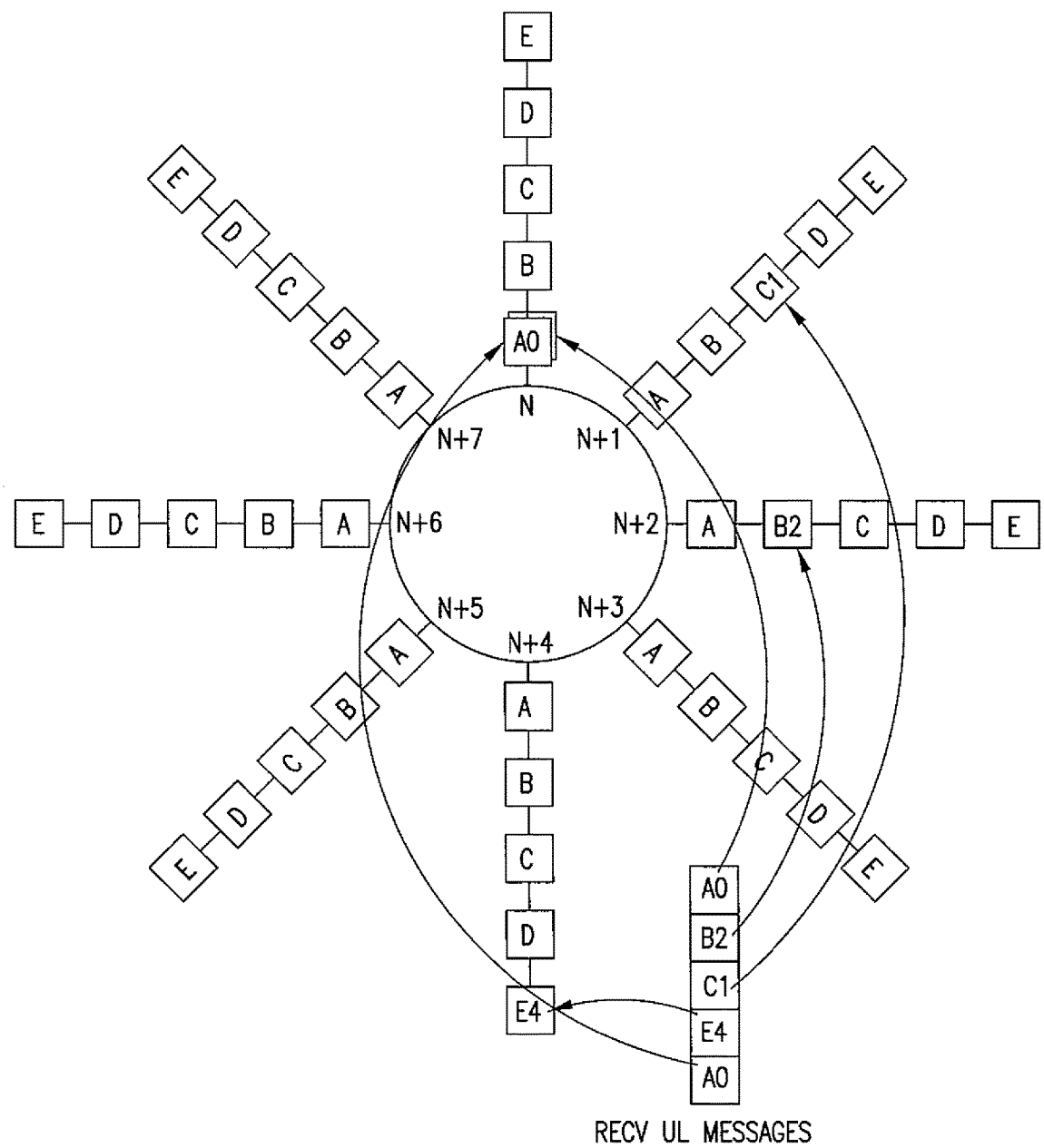

FIG. 6 illustrates placement of messages in the message processing wheel based on message type and processing deadline.

FIGS. 7-10 illustrate flow for processing messages on one spoke of the message processing wheel as the transmit time for messages stored there approaches.

Figure 11:
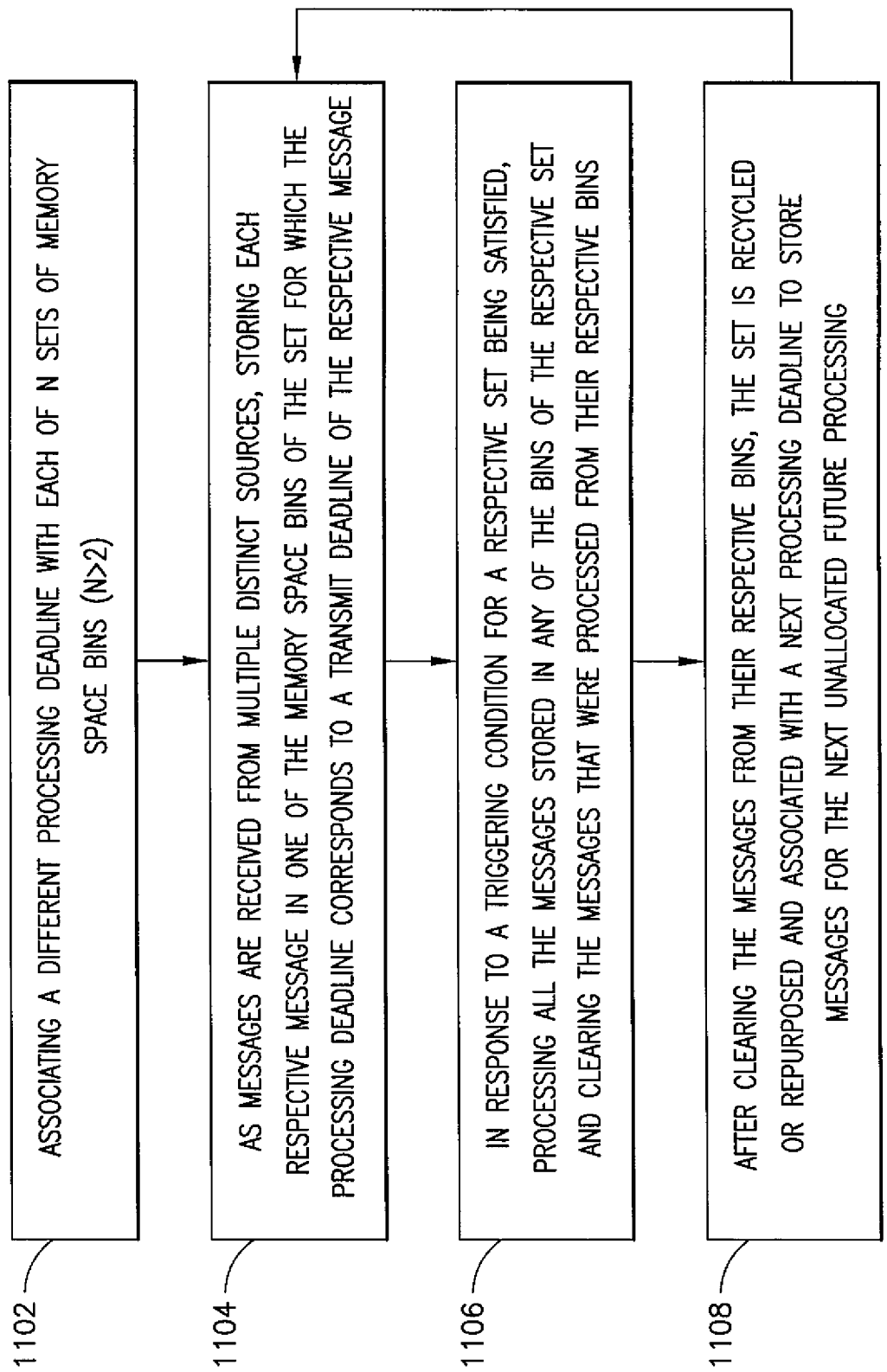

FIG. 11 is a process flow diagram summarizing certain aspects of the invention from the perspective of a point such as the master in FIG. 1 of a multipoint-to-point communication system.

Figure 12:
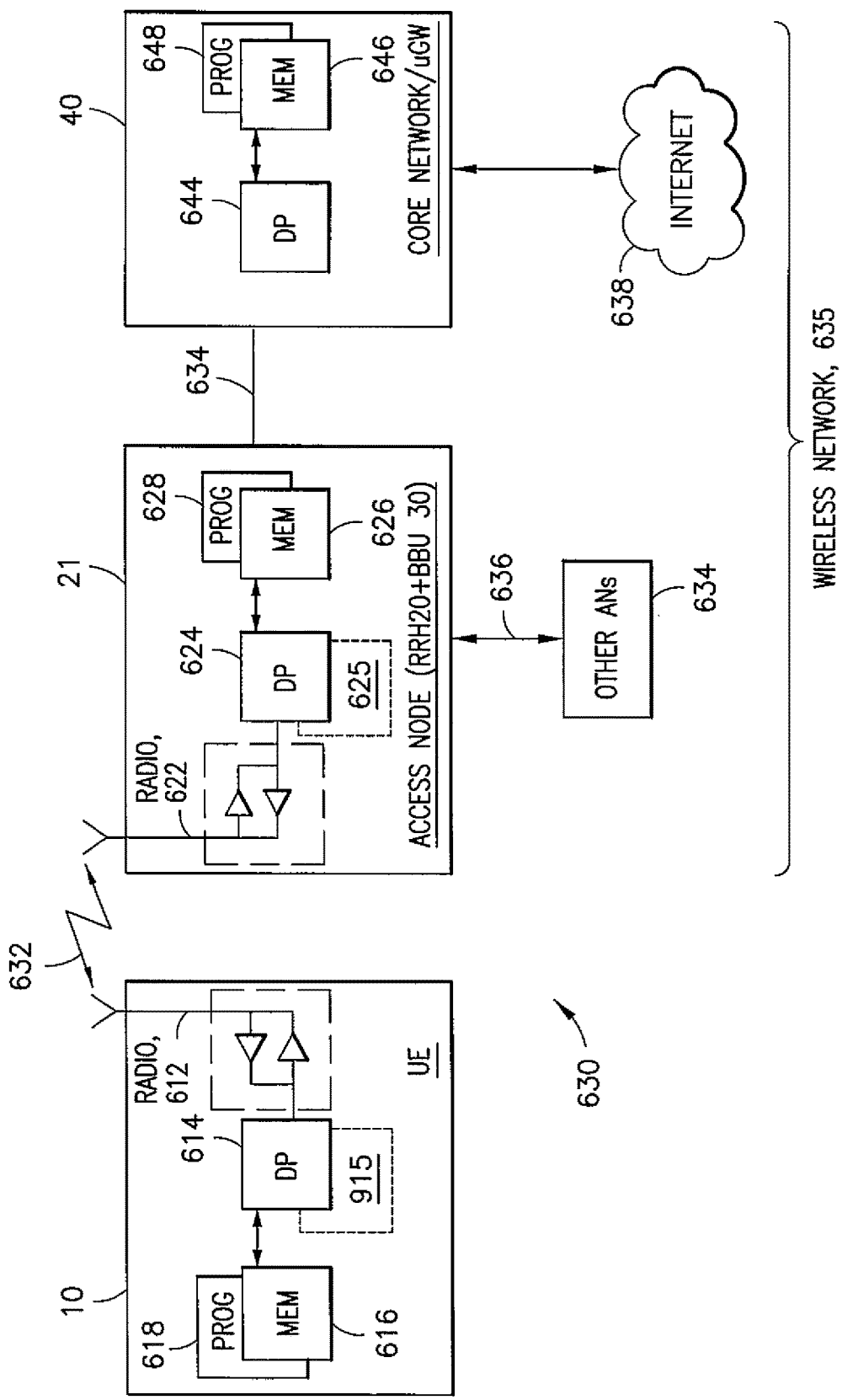

FIG. 12 is a diagram illustrating some components of certain entities of a radio network and components of a UE/mobile device, suitable for practicing various aspects of the invention.

DETAILED DESCRIPTION

These teachings relate to efficiently handling the data traffic being received over multiple data streams such that all of the messages received from these streams can be processed before their processing deadlines have lapsed. This is specifically done while correlating and/or combining the messages of certain types as they get received from different data streams. Being processing within the entity shown in FIG. 1 as the master 20, the specific radio access technology in use and the specific processing split as between the master 20 and the ANTs 30 is not limiting to the broader teachings herein.

The more detailed description below divides between data organization and data processing. The data organizing aspects concern placing the messages received over the continuous stream of data traffic from the distributed sources. The messages are arranged based on their type, their processing deadline, and their priority relative to other messages that have same processing deadline. The efficient data organization also provides a placeholder, which is created/located with minimal processing overhead, to store the message before it is completely consumed or handled. We note beforehand that the data organizing aspects are described below in terms of memory space bins arranged along spokes of a wheel. This is not to imply that in a practical implementation of these teachings the physical arrangement of data memory spaces (or groups of them) form such spokes; the memory spaces are reserved for the different message types/deadlines/priorities as detailed below but their physical juxtaposition relative to one another within a computer memory device are not limited, and in fact their exact physical disposition relative to one another is largely irrelevant to the processor that will reserve the memory spaces, store certain messages therein, and access these stored messages thereafter. The spoke and wheel description is to aid the reader in visualizing the functional arrangement of computer memory spaces that are functionally grouped into memory space bins, and is not a limitation to the physical locations of memory spaces or bins relative to one another.

The data processing aspects of these teachings concern the computer processing of the messages that are received from the multiple parallel data streams and stored in the memory space bins. While the processing logic and the overall process detailed below are dependent on the message type, embodiments of these teachings support messages of widely differing types, nature and processing logic to be handled in the common data processing framework. In the examples below this data processing is driven by certain triggers or stimulus. These triggers could either be an arrival of some known message or expiration of some timers in the system.

While there are many other factors that control overall efficiency of the data handling in such distributed systems such as network speed, computation capabilities of the receiver, efficient processing logic for a given message itself and the like, such factors are deemed orthogonal the broader teachings herein. That is, all else being the same, implementing these teachings enables the handling of a larger volume of real time traffic from a larger number of distributed sources within a centralized receiver with a fixed and limited processing capacity.

Firstly consider the data organization for which the concept will be described in terms of a message processing wheel 100; see FIG. 2. Computer memory spaces are grouped functionally in terms of memory space bins 120 and these bins are grouped in spokes 110 of the wheel 100. Each different bin 120 of a given spoke 110 at FIG. 2 is delineated by an alphabetic designator A, B, C, D and E. The wheel 100 acts as a placeholder for all the incoming messages that require merging/combining or processing relative to each other by the same processing deadline. This means that the wheel 100 shall hold the messages that have the same processing deadline on the same spoke 110 even if they are of different types.

The wheel 100 is driven by periodic ticks from an external timing source which provides these ticks with the accuracy that is sufficient to meet the latency requirements of the wireless radio system. It is convenient that the external timing source may be slaved to the system timing clock that runs the radio operations of the wireless network since the message latency deadlines arise from that network. Timing sources for these periodic ticks are well known in the art.

The message processing wheel 100 has a number of spokes 110 such that each spoke 110 holds messages with the same transmit deadlines; those that are due for transmit at the same time. Each consecutive spoke handles messages due in the next timer interval as compared to the previous spoke. Therefore the time lag between processing of messages stored on adjacent spokes 110 is fixed on the wheel 100.

Each spoke 110 holds a number of bins 120 to store the messages such that there is one bin A, B, etc. per message type on a given spoke 110. Each bin 120 is sized to hold as many messages as the number of sources from which the messages can be received. Each bin 120 can also hold the combined message, if any, and additionally can hold further data that may be needed to process the received messages. The bins 120 are arranged on each spoke 110 in order of the priority of the messages they hold. Keeping in mind the wheel and spoke description is conceptual and not necessarily physical, in practice the messages will be processed from the bins in order of message priority, where different bins represent the different message priorities so the processor need only access the next-in-priority bin rather than read the individual message headers when it is time to prepare them in priority order for transmission to the next destination. This priority order therefore determines the order in which the messages are handled when their processing deadline has been reached. Therefore the order of execution in the processing is the same as the order of priorities of the messages themselves. So for example if Priority(A)>Priority(B)>Priority (C), then messages are processed in the order: A→B→C upon receiving the timer tick for that particular spoke 110.

The wheel 100 is in continuous operation so long as new data is arriving from the various data sources (such as the ANTs 30 of FIG. 1), and so the order in which the bins 120 are arranged on a spoke 110 remains fixed and does not vary from one spoke to another. Thus the processor(s) operating on these messages knows the order in which to access the bins associated with a given spoke will be the same each time the timing tick for that spoke is reached.

The physical memory spaces needed to hold the messages within the wheel 100 is pre-allocated during the initialization of the wheel 100 itself and in an embodiment is not allocated on the fly such as when the messages are received. This further increases the time available to handle the messages themselves. Further, the memory spaces that are used for holding all the messages within a wheel 100 is pre-faulted to prevent any runtime overheads such as those associated with page faults, and this pre-faulted memory is locked to prevent the pages in page tables to be swapped which typically would lead to page faults at some later time.

Consider the process from the perspective of a message received from one data stream. The receiver (at which the wheel 100 is located) determines the processing deadline for that message. Based on that deadline, it identifies the spoke 110 on which the message must be stored. Based on the type of message, it identifies the bin 120 on the spoke 110 where the message must be placed as the receiver waits for same message to arrive from other data streams for combining. A different message of the same type (priority) and with the same deadline that is received from a different source gets stored in the same bin 120 on the same spoke 110. A third message of the same type (priority) and with a different deadline gets stored in the same bin A, B, C etc. bin 120 on a different spoke 110 corresponding to that different deadline. And so on for all the various messages from the multiple sources.

If the system has a variety of messages that need to be handled by different processing deadlines that may not be separated from one another by the same fixed duration, then those other messages can be placed in different message processing wheels 100 where the timing ticks correspond to the deadlines for those messages. The number of such wheels 100 in the overall system/receiver/master should match the number of unique deadlines for all kinds of messages. Consider the two wheel example at FIG. 3; there is a system in which messages in bins A, B, C, D and E are due for processing every 1000 microsecond and also there are further messages in bins U, V, W and X that are due for processing every 600 microseconds, these group of messages could be stored on two separate wheels 100A, 100B, with respective 1000 and 600 microsecond delays between adjacent spokes 110.

Further, even if both these sets of messages need to be processed every 1000 microseconds but at a different offset relative to the other set, then both sets could be placed on two different wheels with the timing ticks of one wheel 100 offset from the timing ticks of the other wheel 100 by that same relative offset. The FIG. 3 example shows this also. Assume for example messages in bins A, B, C, D and E must be processed every 1 millisecond starting at a 300 microsecond offset and hence has processing deadlines at 1.001300 sec, 1.002300 sec, 1.003300 sec, 1.004300 sec, and so forth; and messages in bins U, V, W, and X must be processed every 1 millisecond starting at a 700 microsecond offset then messages U, V, W, and X would have processing deadlines at 1.001700 sec, 1.002700 sec, 1.003700 sec, 1.004700 sec, and so forth. In cases such as these, even though both sets of messages/bins must be processed every 1 millisecond, each set of messages/bins would be placed on a different wheel 100, assuming every spoke on a given wheel is offset in timing from its adjacent spokes by the same amount as discussed above.

Now consider the timers/timing ticks that run the processing of the messages in the bins 120 of the wheel 100. The processing of data stored in the bins 120 of a given spoke 110 may be triggered either when the data is received or when the timer ticks that drives the message processing wheel 100 where the message data is stored. FIGS. 4-5 are examples where these timing ticks trigger the processing of messages on a spoke 110.

All the messages sitting on single spoke 110 have the same processing deadline as mentioned above. The timer/tick is set to expire before each processing deadline. When the timer/tick expires, a trigger is sent to the wheel 100 to drive it and finish the processing of the data that is due for handling within the deadline that corresponds to the current time. The reception of the timer expiration/timer tick indication at the wheel triggers the completion of the processing on each of the messages sitting on the spoke 110 that corresponds to the current time.

The time duration ahead of the processing deadline at which the timer should expire depends on the amount of time it would take to do the remaining processing for all the messages sitting on the spoke 110. We say remaining processing because some pre-processing may be done independent of the timing ticks, for example if the same message is received from multiple sources those messages may be combined and then stored in the appropriate bin as opposed to storing the un-combined same messages and suspending that combining until the timer triggers the processing of all messages on the spoke 110. But whether this same-message combining is done independent of the processing trigger or as a result of it is an implementation detail, and further herein when message processing is discussed such processing refers to that done once the trigger is reached for that spoke 110, whether it be a timing trigger or otherwise.

The processing of messages sitting on the bins 110 is done in a serialized fashion such that all of the messages in one bin A are processed together before processing the messages from the subsequent bins B, C, D, etc. Therefore bins 120 on the spoke 110 are processed in a serialized fashion. For example, if there are an integer number N of bins 120 on a spoke 110 to store messages of respective types M1, M2, . . . Mn; and further if the average processing time for each bin 120 varies and is represented by respective durations T1, T2, . . . Tn; then the amount of time $\Delta Tp$ ahead of the processing deadline by which the timer must expire should be $\Delta Tp = \Sigma_{i=1}^{n} Ti$. As shown in FIG. 4, $\Delta T$ is the time interval between deadlines of adjacent spokes 110 and $\Delta Tp$ is the time duration ahead of the processing deadline for a given spoke 110 to allow for processing of the messages stored in the bins 120 of that spoke 110.

Further, to accommodate for the jitter and any other interruptions that can occasionally cause delays in processing data sitting on the spoke 110 of the message processing wheel 100, the time duration $\Delta Tp$ can be further adjusted, for example such that $\Delta Tp = \Sigma_{i=1}^{n} Ti + Tj$, where Tj represents a maximum jitter time on the receiver/master that is experienced during the message processing.

Since each spoke 110 represents the deadline for all messages in the bins 120 on a given spoke 110, the interval between two adjacent spokes 110 of any given wheel 100, represented as $\Delta T$, must always be larger than $\Delta Tp$ (mathematically, $\Delta T > \Delta Tp$). If it happens that $\Delta T \leq \Delta Tp$ as FIG. 4 illustrates, this means that processing of all the messages on one spoke 110 will not complete in time in order to start the processing of the messages sitting on the next spoke 110, and hence the messages in the spokes 110 that follow will miss their processing deadlines also. In order to avoid such situations, in this case the value $\Delta Tp$ must be reduced. Assuming that the processing times for individual messages Ti (where i indexes from 1 to n) cannot be reduced, the value of $\Delta Tp$ may be reduced by spreading the bins 110 across multiple wheels 110 as is shown at the lower portion of FIG. 4. For example, instead of putting some number N of messages in the same spoke 110 of one wheel 100 at the top of FIG. 4, these can be spread into two wheels at the bottom of FIG. 4 containing q and r number of bins, where $q+r \geq N$.

Consider an example. For simplicity assume $\Delta T = \Delta Tp$.

$$\Delta Tp = \Sigma_{i=1}^{n} Ti + Tj$$

$$n = q + r$$

$$\Delta Tpq = \Sigma_{i=1}^{q} Ti + Tj$$

$$\Delta Tpr = \Sigma_{k=1}^{r} Tk + Tj$$

$$\Delta Tpq < \Delta T$$

$$\Delta Tpr < \Delta T$$

By splitting the bins 120 across multiple wheels 100, the processing time for messages sitting in those bins 120 on each spoke 110 is reduced. Since messages on the spoke 110 for each of these wheels 100 still have the same processing deadline as that of the messages that are sitting within the corresponding bins 120 of the other wheel, the processing of the messages on each wheel happens in parallel, and thus this processing is not serialized or does not share the same computing resources that cause processing of messages on these wheels to be serialized relative to each other. In short, these parallel wheels with identical processing deadlines will not share the same core of the processor/CPU even if they share a same processor/CPU.

Since the processing deadlines of each of these wheels in the FIG. 4 example are aligned with respect to each other, same timer could drive all these wheels or different timers could drive them. FIG. 5 illustrates a situation where three wheels 100 are driven by two different timers; two wheels by timer 1 and one wheel by timer 2. This decision has little to do with the overall efficient processing of data and typically has more to do with how computing resources for processing the messages are split between multiple wheels.

When messages from the multiple sources/ANTs on the multiple data streams are received at the master, the messages on each data stream are parsed based on their type and their processing deadlines. This information is used to locate the message processing wheel that's supposed to hold the received message (in embodiments in which there is more than one processing wheel 100), the spoke 110 within that wheel 100 corresponding to the message's processing deadline, and the bin 120 location within that spoke 110 where the message is to be placed. As the messages are received the wheel 100 and the appropriate bin 120 within that wheel is located for storing that message.

Preferably all access to the wheel 100 for storing the messages is done without using any locks so as to prevent contention between multiple threads of parallel executions on the multiple streams.

FIG. 6 illustrates how multiple different uplink messages that are received at the master 20 are mapped to the proper spoke 110 and bin 120 for storage so they may be efficiently processed in time for their respective deadline for transmission to the next destination. Message A0 has a deadline/latency requirement that corresponds to spoke N and because it is a type A message this is stored in bin A of spoke N as shown by the dotted line. The next arriving message is B2 whose deadline corresponds to spoke N+2; being a type B message it gets stored in bin B of spoke N+2, as shown by the dotted line. The next subsequent message is C1 whose deadline corresponds to spoke N+1 and since it is a type C message it gets stored in bin C of spoke N+1 as the dotted line shows. Next is message E4 with a deadline that corresponds to spoke N+4 and so it gets stored in bin E of spoke N+4 as the dotted line shows, since it is a message of type E. Finally in FIG. 6 is another message A0, which like the first has a deadline corresponding to spoke N and being another type A message it also gets stored in bin A of spoke N like the first message. These two messages A0 at FIG. 6 may be repeats of the same message (either from different sources, or an original and a re-transmission of the same message arriving from the same source) in which case in some embodiments they may be combined once the second message A0 arrives, or they may be different messages which happen to have the same deadline and be of the same type in which case they are both stored in the same bin of the same spoke independent of one another with no combining.

With the above understanding of how the data/messages are organized in the memory spaces of the various bins, spokes and wheels, now the data/message processing is described in further detail. As mentioned above the data processing that is triggered need not encompass the entirety of the processing of these messages that is performed at the master 20; repeat messages may be combined as they are received in certain cases such as the above original transmission and re-transmission for example, and as computing resources are available other processing may be completed as the messages are stored. In embodiments of these teachings the final processing of the messages that accompanies the sending of these messages to their next destination beyond the master may be triggered by the deadline/clock tick, or may be triggered by the data reception itself.

Referring to data reception triggering the processing, the data that is referred to can be the data received from multiple sources external to the receiver unit in a Multi-Point-to-Point deployment over the network but it can also include any information received from within the system such as that generated internally within the receiver through various means such as messages from another processing thread, signaling within the computing environment or the interrupts generated by the hardware. Any of these events can be used to trigger the processing of data on the receiver.

Upon reception, the data that is received can be either placed within the message processing wheel if it needs to be processed at a later time or it can be processed completely right away in the case the data reception itself is a (final) processing trigger or it can be partially processed and stored on the wheel for remainder of the processing to be done at a later time.

Note that for the case that data reception itself is the triggering condition to process a message and send it to its next destination beyond the master, the data received can also trigger processing of some other data already sitting on the wheel that was received previously. For example, the newly received data may indicate an error condition which requires discarding all pending messages on the wheel for cleanup. In this example the finally processed data is not actually sent, but discarding the messages is of course final processing.

In practice it is assumed that for the majority of messages the triggering condition for final processing will be expiration of the timer. Each tick of the periodic timer drives the message processing wheel triggers the processing of data sitting on the spoke that corresponds to the next approaching deadline. Any other data-reception triggering condition will have already dealt with those previously-triggered messages so those will no longer be on that spoke when the timer tick expires. On receiving the indication of the timer tick, the spoke 110 to be handled is identified and data/messages sitting on the bins 120 of that spoke 110 is processed. Once all of the data on the spoke 110 has been processed, the bins 120 are emptied and the spoke 110 is made available to handle the data that has a deadline in the future. In short, a timer tick causes processing of data on one spoke 110, and on completion of processing that spoke 110 becomes available to handle data for a future deadline.

Figure 7:
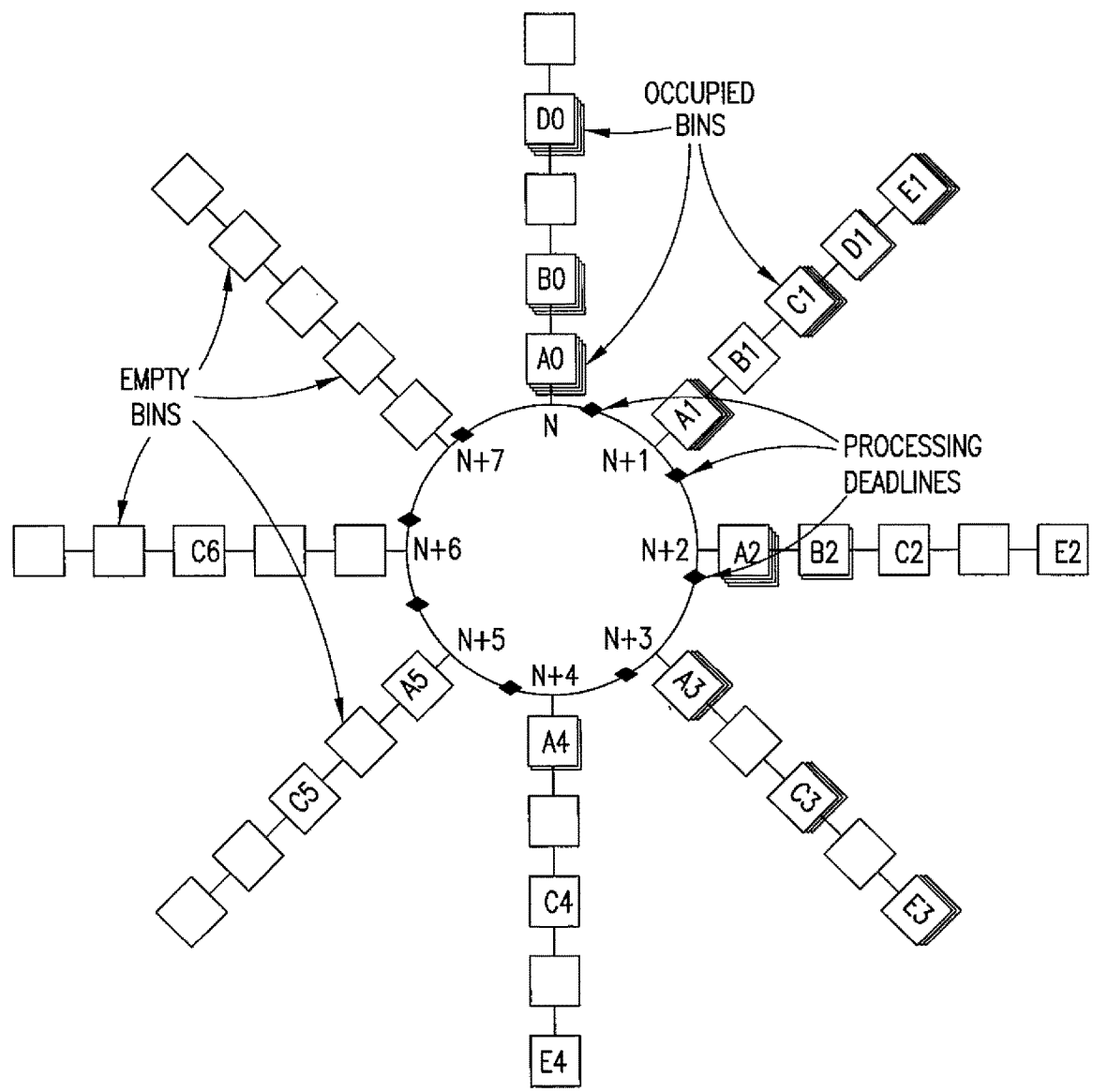

FIGS. 7-10 illustrate an example sequence of events that are triggered as a result of timer expiration. FIG. 7 shows the processing wheel 100 at an instant in time in which certain received messages have already been stored in various bins shown by shading. Bins in which no messages are stored at this time instant are indicated by a lack of shading. Specifically, along spoke N there are messages A0, B0 and D0 in respective bins A, B and D; along spoke N+1 there are messages A1, B1, C1, D1 and E1 in respective bins A through E; along spoke N+2 there are messages A2, B2 and C2 in respective bins A through C; along spoke N+3 there are messages A3, C3 and E3 in respective bins A, C and E; spoke N+4 has messages in bins similar to spoke N+3; spoke N+5 has messages A5 and C5 stored in respective bins A and C; spoke N+6 has only messages C6 in bin 6, and there are no messages stored along spoke N+7. The perspective in FIG. 7 shows that in any given stored bin there may be only one message as at bin A of spoke 5, or there may be multiple messages as at bin A of spoke N.

Figure 8:
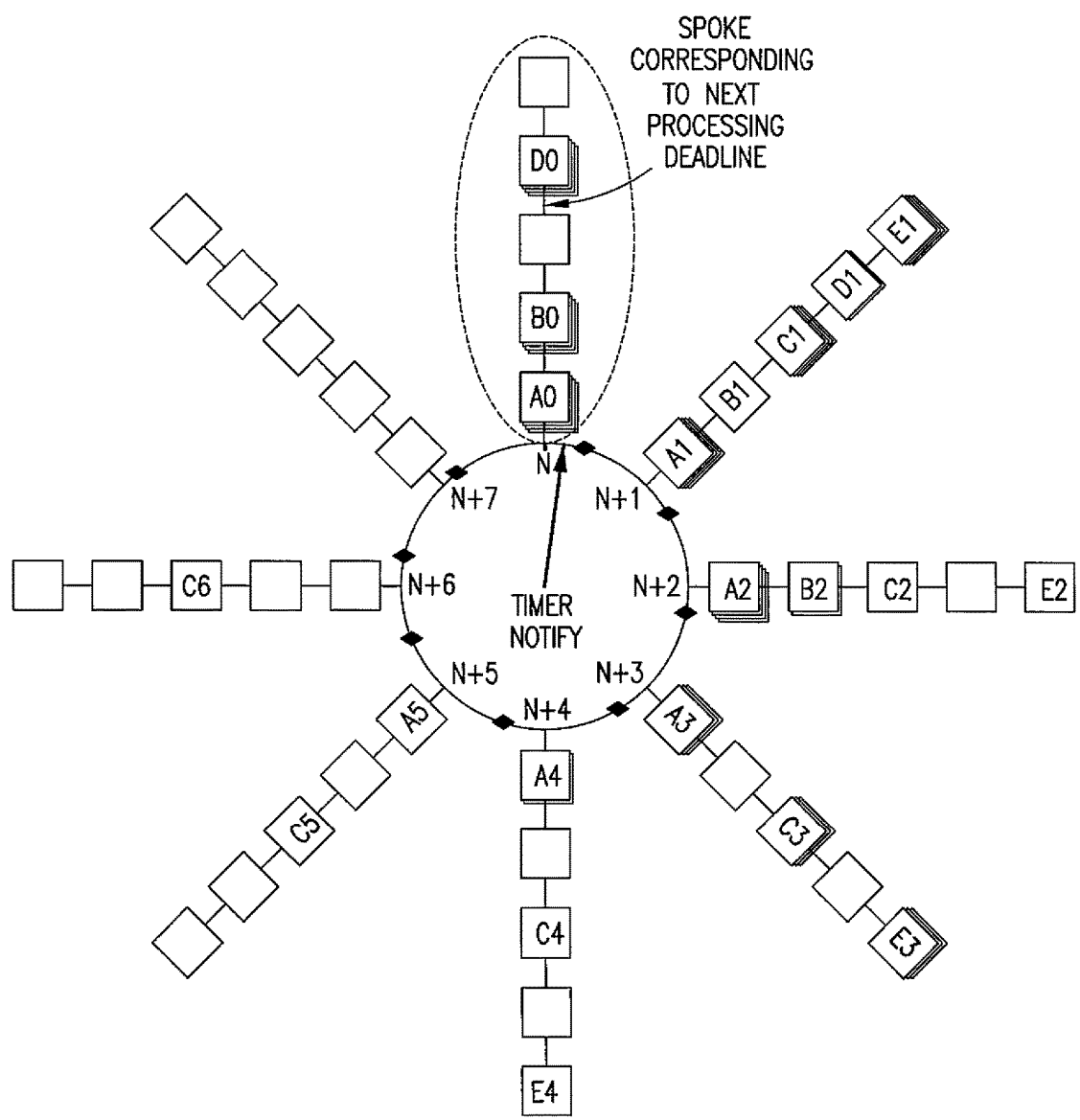

FIG. 8 shows the same messages stored as at FIG. 7 but now there is also a timer shown; assume this timer rotates clockwise; that the processing begins when the timer reaches the indicated N, N+1, N+2, etc.; and the transmit deadline for the messages on the spoke are represented by the small diamond shape immediately clockwise of the indicated N, N+1, N+2, etc. In FIG. 8 the timer is just past spoke N meaning processing of the messages stored in the N-spoke bins has begun but they have not yet been transmitted.

Figure 9:
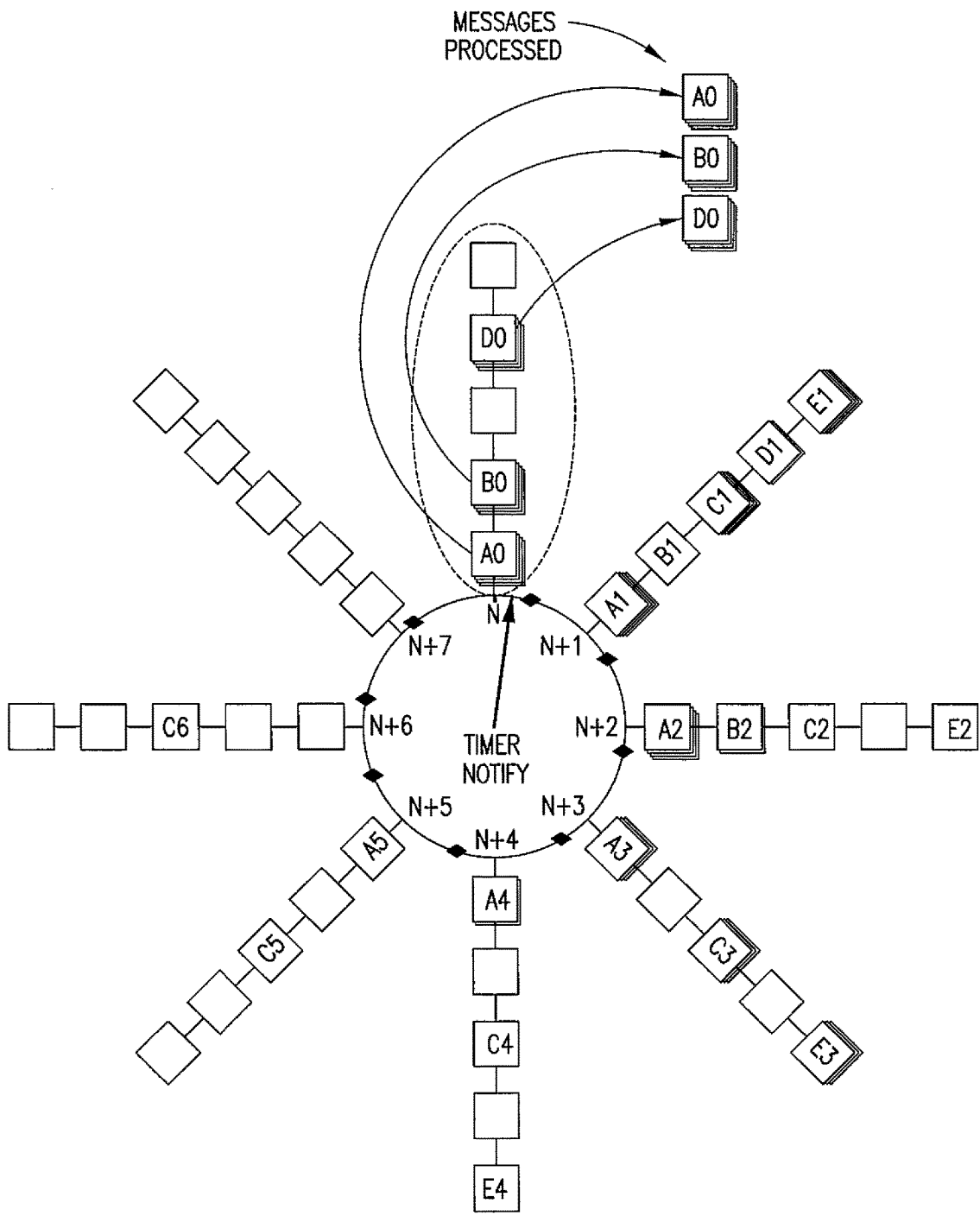

Assuming that the maximum time to process all messages on a spoke is ΔTp seconds, the processing of the messages is triggered by the timer at least ΔTp seconds ahead of the actual processing deadline for the messages on the spoke. The arrow shown in FIG. 9 indicates the time for starting processing just passed and the timer that expired at least ΔTp seconds ahead of processing deadline started the message processing of messages on the corresponding spoke. As shown at the inset of FIG. 9 these messages on spoke N are processed in order of their priority, and this priority corresponds to the message type and the bin in which they are stored. Assume bin A/message type A is the highest priority, followed by B, C, D and finally E. Spoke N has messages only in bins A, B and D and so the priority in which these messages are processed at the timing trigger shown at FIG. 9 is A, followed by B, followed by D. The inset at FIG. 9 may be considered a transmit buffer memory at which the prepared messages await transmission.

Figure 10:
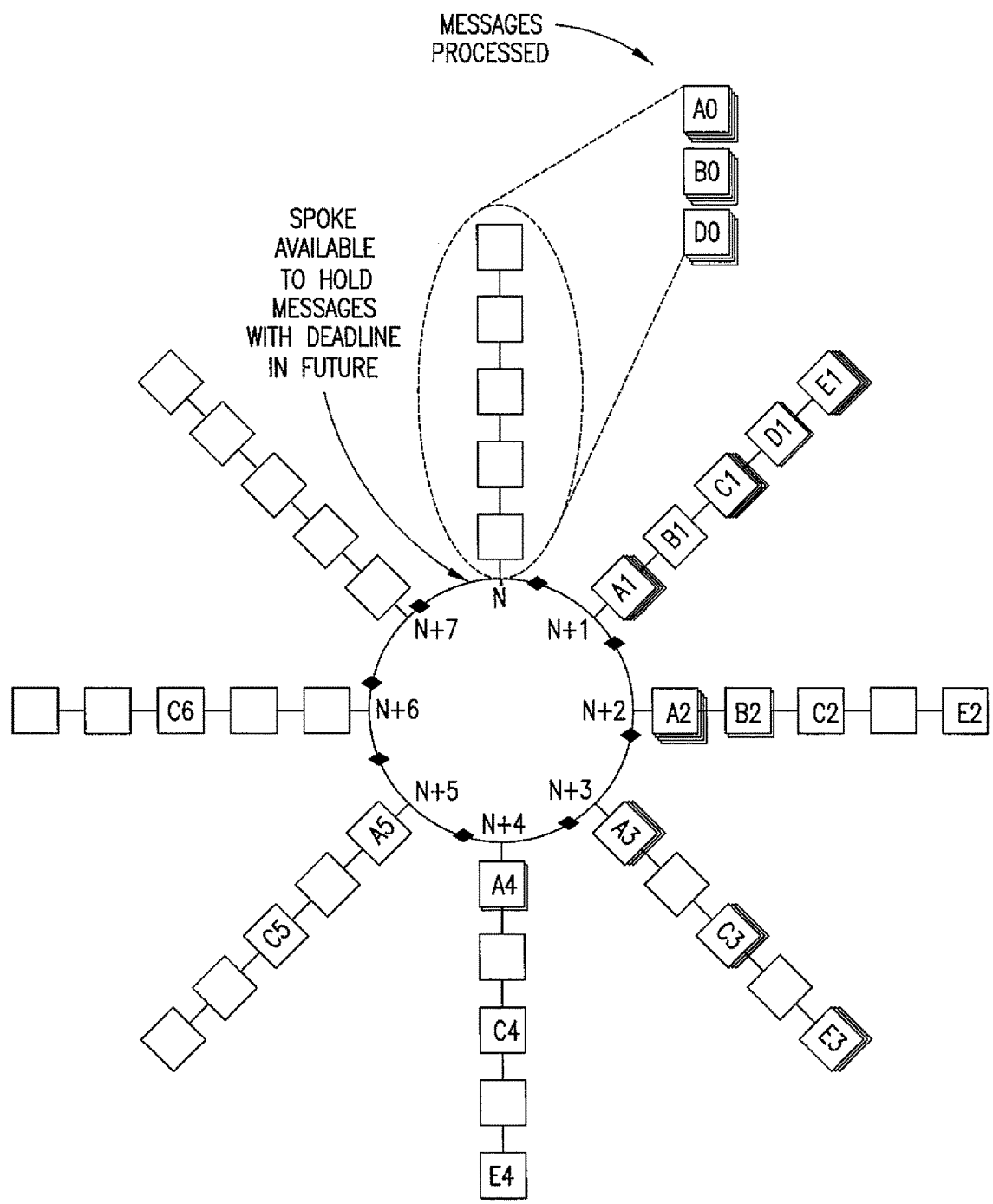

By the time the timer hits the message transmit deadline that corresponds to spoke N (represented by the solid diamond shape to the right of the arrow), these processed messages will have been transmitted to their next respective destinations according to the priority order (for example, unrelated to spoke N at FIG. 9: bin A messages are processed and transmitted as a combined message; then bin B messages are discarded; then bin C messages are processed and transmitted as a combined message, then bins D and E are skipped since they are not storing any messages; and finally bin F messages are processed and transmitted as a combined message). When the timer hits that message transmit deadline the stored messages are purged/deleted from the memory space bins at spoke N, and thereafter spoke N which is now empty is re-purposed for a future deadline which FIG. 10 shows as N+8.

Regardless of whether it is a timer or some other event in the system that triggers the message processing and sending, the messages within each bin 120 can be processed either independently, or based on messages in other bins, or relative to messages in other bins. These teachings provide a framework that is flexible enough to enable correlating data that is waiting to be processed based on the type and the deadlines. The data to be correlated can be quickly identified through lookup based on the message type and the processing deadline without the master having to perform an exhaustive search through all of the stored data simply by looking in the proper pre-allocated bin. The following two examples illustrate this.

In a first example assume that all of the messages of type A must be combined into a single message which is then sent to a different destination every 1 ms. In this example, when a 1 ms timer expires, all of the messages of type A are pulled out from the bin that stores messages of type A on the spoke that corresponds to the next transmit deadline, where each transmit deadline is 1 ms apart. These are then combined into a single message and sent to the next destination. In this example the master need only identify the spoke corresponding to the next transmit deadline and fetch all the messages from bin A on that spoke.

In a second example 2: assume all of the messages of type D are to be combined and transmitted every 1 ms only if there are no messages of type B available for transmission. In this example, when the 1 ms timer expires, the bin corresponding to message type B is located and checked to see if there are any messages waiting to be processed. If yes, then all of the messages in the bin corresponding to messages of type D on that same spoke are discarded. If no, then messages of type D are combined and transmitted (keeping in mind the priority of processing discussed above since in this latter case there are messages of at least type B and of type D).

Previous approaches to data organization known to the inventor do not provide this flexibility or simplicity. For example, if the data packets received from various sources are merely listed in some kind of order according to type or source or arrival timing or processing deadline, the overhead for searching for placeholders for data increases as more packets are received and as more data sources are added. This is not seen to be a tenable solution in future radio networks where there is a substantially larger number of data sources and data streams being accumulated at one master as compared to more conventional systems. A hashing function can be used allows constant overhead for such a search regardless of the number of elements to search and this may avoid the variability in overheads associated with locating placeholder for the data, but still the pre-allocated memory space bins on spokes associated with processing/transmit deadlines is a far simpler and more efficient way to handle such data and enable searching of it for purposes of transmission and the processing related to such transmission.

Embodiments of these teachings provide at least three distinct technical effect. First they enable very fast data storage and retrieval. Whenever the new data is received and needs to be placed for processing in the future, a search is performed to locate the placeholder for this data. Similarly whenever the processing deadline approaches and the data needs to be processed, the data needs to be located. Therefore overheads associated with these searches should be minimum, deterministic, and in fact are key to determining the processing capacity of the receiver. These teachings provide fast data storage because the memory spaces are pre-allocated per transmit/processing deadline and per message type/priority, and this same concept also provides for fast retrieval.

Alternative arrangements for data organization that arranges data in a certain order based on parameters like message time, source, deadline etc. inherently exhibit a varying amount of overhead that grows with the sample size. For example if data is organized based on the source, as more sources are added the system's performance would degrade. Similarly, if data packets are organized based on the order in which they are received, then the search overhead increases as more and more packets arrive and are held at the receiver.

In this regard one significant advantage of these teachings is the constant search overhead that does not vary with sample size. As mentioned above, hashing functions on the data can also achieve this constant search overhead but the overheads of executing such a hashing algorithm is significantly larger as compared to the search overhead required for these teachings where placeholders (memory space bins) are located very simply using two identifiers: message type (priority), and message deadline. These two identifiers can be mapped directly to the indices of a two-dimensional array.

Another technical effect of these teachings is that they are extendable to cover a wide range of applications. The techniques detailed herein are independent of the nature of messages, the source of messages, the logic or scheme used to process the messages, and how the messages are received.

These teachings impose no limit on the amount of traffic or number of sources of the traffic in any way; if one wheel fills up or too many messages do not allow sufficient processing time these teachings are scalable so that simply another wheel can be added using the same principles described for the first. These teachings can therefore be employed for any multipoint-to-point deployment. For example, Network Interface Cards (NIC) handling the Link Aggregation or Trunking in local area network (LAN) connections may utilize this these teachings to aggregate the data packets that are received from different ports to maintain the packet ordering for reassembling the fragmented Ethernet frames. Single Frequency Network (SFN) on wireless networks could utilize these teachings for processing the baseband traffic received from distributed Antennas and/or Accesspoints responsible for Layer 1 processing of the wireless networking stack as detailed for FIG. 1.

A third technical effect of these teachings is that they are portable for use on a wide range of platforms. There are no unique hardware characteristics exploited or required to implement these teachings; they may be embodied as tangibly-stored software (including firmware) or as a hardware solution or a combination of both in a product offering. Any kind of computer readable storage can be used for the message processing wheel that provides the placeholder for the received data, although the performance gains would of course depend on how fast that memory can be accessed. Similarly, any system capable of providing a reliable timer could be utilized to trigger the processing of data packets before the processing deadline approaches.

Due to a wide-range of applications, embodiments of these teachings could feature in a System on Chip (SoC) silicon in form of a hardware accelerator such that a hardware accelerator module provides a range of message processing wheels that could potentially be driven by the associated timers without any software intervention, or at least with minimal software intervention.

Certain embodiments may be identified by a few characteristics that identify these teachings. These are characteristics of the CPU and memory utilization of the software components that process the data streams. Any instrumentation that can monitor memory consumption and/or the non-idle CPU cycles spent by software components running on the system should be able to identify these characteristics and help determine the usage of these teachings.

As the number of data streams or the amount of traffic on those increase, there should be a little-to-no difference in the overall memory consumption within the software components that are responsible for processing the data streams.

The processing of data packets received from multiple data streams is triggered periodically by timers. Therefore, the non-idle CPU cycles consumed by the software components processing data streams would show a spike around those deadlines. Furthermore, as the number of data streams or amount of traffic received increases, the amount of CPU cycles spent periodically around the timer expiration should show a notable increase as well. Hence one characteristic is that the periodic spikes in CPU cycle consumption get bigger with a higher number of data streams and with a higher traffic rate.

FIG. 11 is a process flow diagram summarizing some of the major points that are detailed above with particularity and recite from the perspective of the master 20. At block 1102 the master associates a different processing deadline with each of N sets of memory space bins. N is an integer which we can assume in most deployments will be greater than two but as mentioned above in some implementations it may be an integer greater than one. These sets of memory space bins represent the spokes described above. At block 1104, as messages are received from multiple distinct sources such as the ANTs of FIG. 1 or the LAN connection ports mentioned above, the master stores each respective message in one of the memory space bins of the set for which the processing deadline corresponds to a transmit deadline of the respective message. So the pre-allocated memory spaces are associated with timings (see spoke N+8 at FIG. 10 which is allocated independent of any message being received with that timing) and the message has a transmit deadline (for example in the message header) that the master uses to correlate to a spoke. Finally at block 1106, automatically in response to a triggering condition for a respective set being satisfied the master processes all the messages stored in any of the bins of the respective set and clears the messages that were processed from their respective bins. As detailed above this does not mean all processing of the messages must occur when the triggering condition is satisfied, but embodiments of these teachings will exhibit the characteristic of a spike in processing that occurs for the data in these bins when the trigger is a timing condition such as the ΔTp prior to the timing tick for a given spoke/set. This also does not imply that the received messages are the only data stored in the various bins, and this also is detailed above. To illustrate the process is continuous once it's begun, at block 1108 after the messages are cleared from their respective bins that set is recycled/re-purposed in that the cleared set is associated with a next processing deadline for the next unallocated future processing. The return arrow from block 1108 to block 1104 shows the continuous loop nature of this aspect of these teachings. An example of this FIGS. 8-10 showed the set N being re-purposed for the next set N+8 of the wheel after the messages of set N were processed and transmitted.

In one embodiment the messages are real time multipoint-to-point traffic, and in specific non-limiting examples above FIG. 11 was performed by a base station (or BBU) that receives the messages from multiple distributed antennas ANTs and the processing of block 1106 comprises wireless network layer 2 processing, whereas in another embodiment FIG. 11 was performed by a network interface card that receives the messages from multiple local area network connection ports and the processing of block 1106 comprises link aggregation and/or trunking.

In the non-limiting examples above, for each set/spoke of memory space bins the messages are stored in the respective bins according to a priority that is determined from type of each respective message, such that each bin of each set/spoke stores only messages of one type. In these non-limiting examples for each respective set the processing at block 1106 of all the messages stored in any of the bins of the respective set is done in order of the priorities, but as mentioned above this does not mean no processing can take place apart from the triggered processing. And further in those examples, for each respective set all messages of the same type are stored in only one bin, and the processing at block 1106 is done per bin and this processing comprises combining at least some the same type messages (for example, same messages received from different sources if this was not done when the messages were first stored) and thereafter sending all the messages of the respective set/spoke to a next destination or destinations by the respective transmit deadline.

With regard to the timing between the sets/spokes, in one embodiment there is a same time lag between each chronologically adjacent pair of the processing deadlines. In some examples for this above the triggering condition at block 1106 is expiry of a timer offset ΔTp ahead of the processing deadline for the respective set/spoke. In one non-limiting example the timer offset is computed for each respective set/spoke based on a time to perform said processing at block 1106 of all the messages that are stored in any of the bins of the respective set/spoke. Various implementations of two or more wheels are detailed, but in at least one such implementation the steps of FIG. 1*l* is performed on the N sets of memory space bins mentioned at block 1102 and further on an additional M sets of memory space bins (M is an integer typically also greater than two, but in some implementations it is an integer greater than one); and in this case the two wheels might be distinguished in that the triggering condition at block 1106 for each of the N sets of memory space bins and of the M sets of memory space bins is a timing deadline such that and no timing deadline among the N sets (first wheel) is identical to any timing deadline among the M sets (second wheel).

Timing is not the only possible triggering condition. In one embodiment the triggering condition can be the earliest occurrence of any of the group consisting of: a) expiry of a timer offset ΔTp ahead of the processing deadline for the respective set/spoke; b) at least one of the bins is sufficiently full that an additional message cannot be stored therein; and c) all messages from all of the multiple distinct sources have been received (for example where all of the multiple distinct sources are sources ANTs of one cell). And as mentioned above the N sets of memory space bins at block 1102 can be allocated for storing the messages and also can be associated with the respective different processing deadlines prior to receiving any of the messages from any of the multiple distinct sources.

Certain embodiments of these teachings may be made manifest in an apparatus comprising at least one processor and at least one memory tangibly storing a computer program; wherein the at least one processor is configured with the at least one memory and the computer program to cause the apparatus to perform in one embodiment the specific process steps shown at FIG. 11, and as these process steps are more fully detailed above. Such embodiments can also be made manifest in a computer readable memory tangibly storing a computer program that when executed causes an entity in the position of the master at FIG. 1 to perform the process shown at FIG. 11 and as more fully detailed above.

In one embodiment FIG. 11 can be considered as an algorithm, and more generally represents steps of a method, and/or certain code segments of software stored on a computer readable memory or memory device that embody that algorithm for implementing these teachings from the perspective of the master (base station/radio access node, NIC, and the like). In this regard the invention may be embodied as a non-transitory program storage device readable by a machine such as for example one or more processors of a radio network access node (including one or multiple BBUs) or a NIC, where the storage device tangibly embodies a program of instructions executable by the machine for performing operations such as those of the algorithms mentioned above.

FIG. 12 is a high level diagram illustrating some relevant components of various communication entities that may implement various portions of these teachings, including a base station identified generally as a radio network access node 21 (shown at FIG. 12 as the RRH 20 plus the BBU 30), a core network which may also be co-located with a user-plane gateway (uGW) 40, and a user equipment (UE) 10. In the wireless system 630 of FIG. 12 a communications network 635 is adapted for communication over a wireless link 632 with an apparatus, such as a mobile communication device which may be referred to as a UE 10, via a radio network access node 21. The core network 635 may include a Serving- or User-GW 40 that provides connectivity with other and/or broader networks such as a publicly switched telephone network and/or a data communications network (e.g., the internet 638). The uplink messages that are processed as described in the above examples may be sent to the core network as their next destination, even if not their final destination.

The UE 10 includes a controller, such as a computer or a data processor (DP) 614 (or multiple ones of them), a computer-readable memory medium embodied as a memory (MEM) 616 (or more generally a non-transitory program storage device) that stores a program of computer instructions (PROG) 618, and a suitable wireless interface, such as radio frequency (RF) transceiver or more generically a radio 612, for bidirectional wireless communications with the radio network access node 21 via one or more antennas. In general terms the UE 10 can be considered a machine that reads the MEM/non-transitory program storage device and that executes the computer program code or executable program of instructions stored thereon. While each entity of FIG. 12 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The radio network access node 21 also includes a controller, such as a computer or a data processor (DP) 624 (or multiple ones of them), a computer-readable memory medium embodied as a memory (MEM) 626 that stores a program of computer instructions (PROG) 628, and a suitable wireless interface, such as a RF transceiver or radio 622, for communication with the UE 10 via one or more antennas. The radio network access node 21 is coupled via a data/control path 634 to the core network 40. In certain 5G deployments prior to the point 5G can stand alone it may be that the gNB 21 is coupled to an eNB of a LTE system according to a 5G-LTE interworking arrangement, in which case the core network is likely to be the eNB's. However deployed, the radio network access node 21 may also be coupled to other radio network access nodes (ANs) 634 via data/control path 636.

The core network 40 includes a controller, such as a computer or a data processor (DP) 644 (or multiple ones of them), a computer-readable memory medium embodied as a memory (MEM) 646 that stores a program of computer instructions (PROG) 648.

At least one of the PROGs 628 is assumed to include program instructions that, when executed by the associated one or more DPs, enable the device to operate in accordance with exemplary embodiments of this invention. That is, various exemplary embodiments of this invention may be implemented at least in part by computer software executable by the DP 624 of the radio network access node 21; and/or by hardware, or by a combination of software and hardware (and firmware).

For the purposes of describing various exemplary embodiments in accordance with this invention the UE 10 and the radio network access node 21 may also include dedicated processors 615 and 625 respectively.

The computer readable MEMs 616, 626 and 646 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 614, 624 and 644 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 612 and 622) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which may be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:

3GPP Third Generation Partnership Project
ANT antenna
BBU baseband unit
BS Base Station
E-UTRAN evolved UMTS radio access network
gNB base station of a 5G system
LAN local area network
LTE long term evolution (of E-UTRAN; also referred to as 4G)
m-MIMO Massive Multiple-Input Multiple Output
NIC network interface card
NR new radio (also referred to as 5G)
PUSCH physical uplink shared channel
RRH remote radio head
TRP Transmission-Reception point
UMTS universal mobile telecommunications service

What is claimed is:

1. A method comprising:
   associating a different processing deadline with each of N sets of memory space bins, where N is an integer greater than two;
   as messages are received from multiple distinct sources, storing each respective message in one of the memory space bins of the set for which the processing deadline corresponds to a transmit deadline of the respective message; and
   in response to a triggering condition for a respective set of the N sets of memory space bins being satisfied, processing all the messages stored in any of the memory space bins of the respective set of the N sets of memory space bins and clearing the messages that were processed from the memory space bins,
   wherein the triggering condition is the earliest occurrence of any of the group consisting of:
      expiry of a timer offset ahead of the processing deadline for the respective set;
      at least one of the bins being sufficiently full that an additional message cannot be stored therein; and
      all messages from all of the multiple distinct sources having been received, where all of the multiple distinct sources are sources of one cell.

2. The method according to claim 1, wherein the messages are real time multipoint-to-point traffic, and one of:
   the method is performed by a base station that receives the messages from multiple distributed antennas and the processing comprises wireless network layer 2 processing; and
   the method is performed by a network interface card that receives the messages from multiple local area network connection ports and the processing comprises link aggregation and/or trunking.

3. The method according to claim 1, wherein, for each set of memory space bins, the messages are stored in the respective bins according to a priority determined from type of each respective message, such that each bin of each set stores only messages of one type.

4. The method according to claim 3, wherein for each respective set the processing of all the messages stored in any of the bins of the respective set is done in order of the priorities.

5. The method according to claim 4, wherein for each respective set all messages of the same type are stored in only one bin and the processing is done per bin and comprises combining at least some the same type messages and thereafter sending all the messages of the respective set to a next destination or destinations by the respective transmit deadline.

6. The method according to claim 1, wherein there is a same time lag between each chronologically adjacent pair of the processing deadlines.

7. The method according to claim 6, wherein the triggering condition is expiry of a timer offset ahead of the processing deadline for the respective set.

8. The method according to claim 7, wherein the timer offset is computed for each respective set based on a time to perform said processing of all the messages that are stored in any of the bins of the respective set.

9. The method according to claim 6, wherein:
the method is performed on the N sets of memory space bins and further on an additional M sets of memory space bins, where M is an integer greater than two; and
the triggering condition for each of the N sets of memory space bins and of the M sets of memory space bins is a timing deadline, and no timing deadline among the N sets is identical to any timing deadline among the M sets.

10. The method according to claim 1, wherein the N sets of memory space bins are allocated for storing the messages and associated with the respective different processing deadlines prior to receiving any of the messages from any of the multiple distinct sources.

11. An apparatus comprising:
at least one processor; and
at least one computer-readable memory tangibly storing computer program instructions, wherein the at least one processor is configured with the at least one computer-readable memory and the computer program instructions to cause the apparatus to perform actions comprising:
associate a different processing deadline with each of N sets of memory space bins, where N is an integer greater than two;
as messages are received from multiple distinct sources, store each respective message in one of the memory space bins of the set for which the processing deadline corresponds to a transmit deadline of the respective message; and
in response to a triggering condition for a respective set of the N sets of memory space bins being satisfied, process all the messages stored in any of the memory space bins of the respective set of the N sets of memory space bins and clearing the messages that were processed from the memory space bins,
wherein the triggering condition is the earliest occurrence of any of the group consisting of:
expiry of a timer offset ahead of the processing deadline for the respective set;
at least one of the bins being sufficiently full that an additional message cannot be stored therein; and
all messages from all of the multiple distinct sources having been received, where all of the multiple distinct sources are sources of one cell.

12. The apparatus according to claim 11, wherein the messages are real time multipoint-to-point traffic, and one of:
the apparatus comprises a base station that receives the messages from multiple distributed antennas and the processing comprises wireless network layer 2 processing; and
the apparatus comprises a network interface card that receives the messages from multiple local area network connection ports and the processing comprises link aggregation and/or trunking.

13. The apparatus according to claim 11, wherein, for each set of memory space bins, the messages are stored in the respective bins according to a priority determined from type of each respective message, such that each bin of each set stores only messages of one type.

14. The apparatus according to claim 11, wherein there is a same time lag between each chronologically adjacent pair of the processing deadlines.

15. The apparatus according to claim 14, wherein the triggering condition is expiry of a timer offset ahead of the processing deadline for the respective set.

16. The apparatus according to claim 14, wherein:
the actions are performed on the N sets of memory space bins and further on an additional M sets of memory space bins, where M is an integer greater than two; and
the triggering condition for each of the N sets of memory space bins and of the M sets of memory space bins is a timing deadline, and no timing deadline among the N sets is identical to any timing deadline among the M sets.

17. A computer-readable memory tangibly storing a program of computer executable instructions that, when executed by one or more processors, causes a host device to at least:
associate a different processing deadline with each of N sets of memory space bins, where N is an integer greater than two;
as messages are received from multiple distinct sources, store each respective message in one of the memory space bins of the set for which the processing deadline corresponds to a transmit deadline of the respective message; and
in response to a triggering condition for a respective set of the N sets of memory space bins being satisfied, process all the messages stored in any of the memory space bins of the respective set of the N sets of memory space bins and clearing the messages that were processed from the memory space bins,
wherein the triggering condition is the earliest occurrence of any of the group consisting of:
expiry of a timer offset ahead of the processing deadline for the respective set;
at least one of the bins being sufficiently full that an additional message cannot be stored therein; and
all messages from all of the multiple distinct sources having been received, where all of the multiple distinct sources are sources of one cell.

18. The computer readable memory according to claim 17, wherein, for each set of memory space bins, the messages are stored in the respective bins according to a priority determined from type of each respective message, such that each bin of each set stores only messages of one type.

\* \* \* \* \*